Sept. 13, 1927.
J. W. FULPER
1,641,967
METHOD OF MAKING AND STRUCTURE OF GEARS
Original Filed Jan. 17, 1922
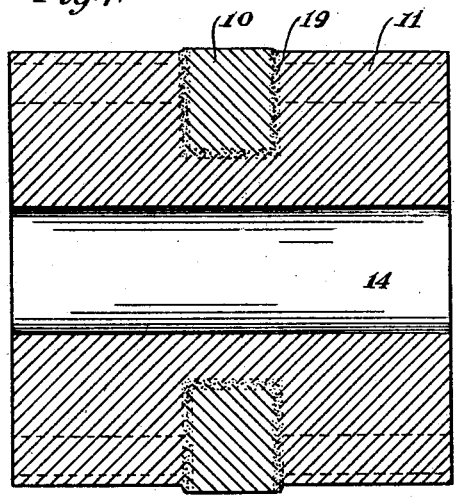
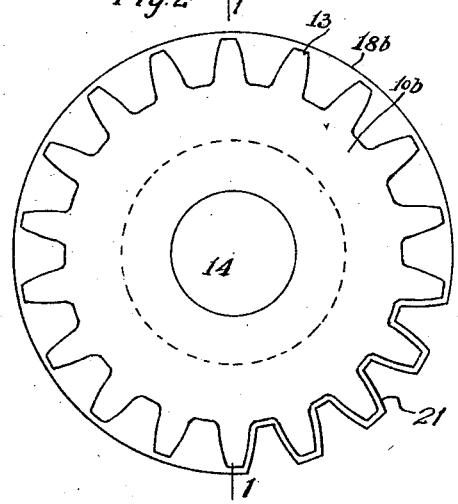
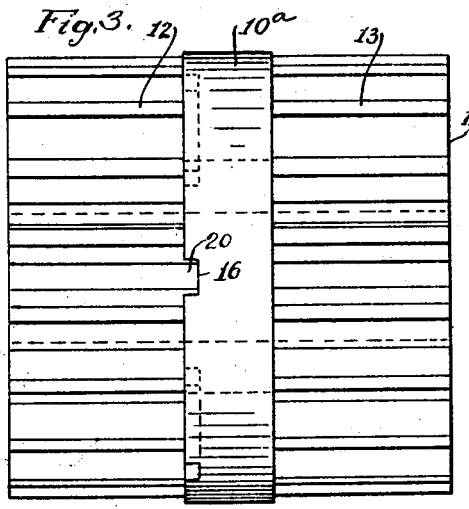
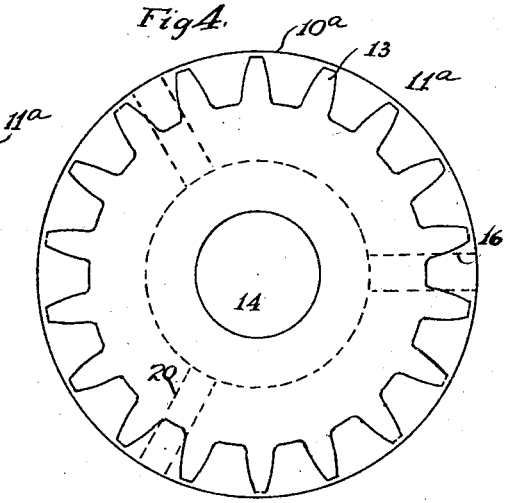
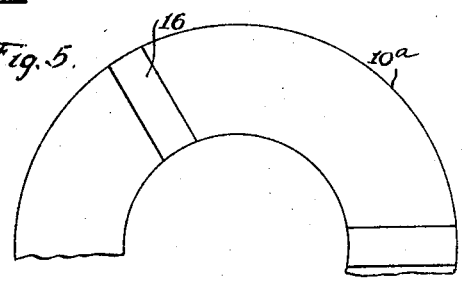
INVENTOR
John W. Fulper.
BY
Harold D. Penner
ATTORNEY Patented Sept. 13, 1927.

1,641,967

UNITED STATES PATENT OFFICE.

JOHN W. FULPER, OF ANNANDALE, NEW JERSEY.

METHOD OF MAKING AND STRUCTURE OF GEARS.

Original application filed January 17, 1922, Serial No. 529,821. Divided and this application filed June 19, 1925. Serial No. 38,227.

This invention relates to improvements in composite gears composed of metals of different degrees of hardness, and particularly to matter divided from my application Serial No. 529,821, filed Jan. 17, 1922, for a method of making and structure of gears which has resulted in Patent No. 1,557,522 issued Oct. 13, 1925.

My said patent relates to an improvement in gears and a method of making the same, and has to do with a form of gears of spur or other types wherein metals which are highly refractory, or resistant to machining, grinding or wear, such as manganese steel may be utilized in making gears of a superior type with true running quality and fairly even spacing of the teeth.

An object of the invention of said patent is to take advantage of the strength and resistance, or highly refractory nature of manganese steel and at the same time obtain machine precision as nearly as possible in making all gears of this material without having to go to the great expense of grinding the faces of the teeth of manganese steel, thereby obviating this expensive grinding operation, as it is well known that manganese steel is not otherwise machinable by present known methods.

According to one method described in said patent, the gear is formed by first casting a manganese gear body provided with an axial bore and one or more intermediate annular grooves around the body having inwardly projecting lugs in a side wall of the groove, the body having alined longitudinal gear teeth on respectively both sides of said groove. Then I cast an annular iron ring in said groove and around said lugs and projecting beyond said teeth and grind out said bore. Under certain circumstances, as will be explained, said lugs may be omitted; and also the ring may be cast first and the gear body cast thereto.

According to other methods described in said patent, the manganese steel body is cast and fused onto the highly heated previously cast ring, the ring being cast, if desired, with locking recesses thereby to form locking lugs on the gear body.

Said ring is next turned down until it projects only slightly above said teeth, and the ring is then machined to form therein precise teeth alined with the cast teeth and slightly projecting beyond said teeth rearwardly and forwardly. Then the gear is used in cooperation with another gear until the machined teeth are worn to practically the same contour as the cast teeth.

My above identified patent now relates particularly to the formation and construction of the gear teeth; while the present application relates more particularly to the method of casting the iron ring into the gear body and interlocking them.

Manganese steel may be cast to any desired shape by the usual foundry methods and a fairly precise and dependable casting obtained within reasonable limits of tolerance requirements; but it is practically impossible to have such castings come sufficiently precise for high class work; and my method of making the gears overcomes this difficulty to a satisfactory extent and permits the making of gears of this highly wear resisting material, and at the same time makes it possible to obtain the necessary smooth running precision necessary in gears of this high class type.

My above identified patent relates particularly to the formation and construction of the gear teeth; while the present application relates more particularly to the method of casting the gear body onto the ring and interlocking them.

In the annexed drawing,

Fig. 1 is a sectional view taken on the line 1—1 of Fig. 2, showing a gear during the process of another form of construction;

Fig. 2 is an end view of the incompleted gear shown in Fig. 1;

Fig. 3 is a side view of another form of gear in the incompleted state;

Fig. 4 is an end view of the incompleted gear of Fig. 3; and

Fig. 5 is a fragmentary side elevation of one of the component parts of the incompleted gear of Figs. 3 and 4.

In the form of the invention in accordance with Figs. 1 and 2, a ring 10 is first made and placed in a mold and the main body 11 of the gear is cast thereabout in resistant, or refractory, manganese steel with all of the teeth 12 and 13 thereon in the usual form and with a central opening, or bore 14, intermediately of the ends of the gear. Due to this manner of making, the cast iron ring 10 will fuse with the main body 11 as indicated by the stippling at 19 (Fig. 1).

The bore 14 has no special significance herein, except that in manganese castings it is customary to cast these bores because they cannot be drilled; and they are afterwards finished by grinding, due to the fact that because of the great toughness of manganese steel, grinding is the only method known of machining.

It will be noted that the ring 10 is somewhat larger in diameter than the outside of the manganese gear body. This is done in order to provide an excess of metal so that when finishing the cast iron ring it may be first turned to the nominal diameter of the gear body 11 and then all of the teeth 21 (Fig. 2) thereafter cut out as will be described.

After the gear has been made as far as above described, and after grinding out the bore 14 to permit of the insertion of the usual mandrel for mounting the gear for machining, the cast iron ring is turned down to the diameter of the body, and the gear is set in a gear cutting machine. The ring is then provided all around with the teeth 21 (Fig. 2) in the usual manner, as by cutting or hobbing, with the result that the said ring 10 is formed with precisely cut teeth therein.

In the cutting of the teeth 21, the gear teeth cut thereon are cut in relation to the teeth already cast on the body 11, but are a little full of the proportions there shown so as to obviate the possibility of the gear cutting tool from striking the manganese, and to also provide a wear away surface which will be later described.

In the foregoing description the process of making the gear has been described, and also reference was made to the cutting of the gears in the cast iron so as to leave the cast iron teeth somewhat larger in dimension all around, so as to leave them a wear surface a little in advance of the manganese cast teeth.

In making manganese gears and casting the teeth therein there is always more or less irregularity in the forming and spacing of the cast manganese teeth which will in all probability, give the effect of lumps upon the faces of the said teeth. By cutting the teeth 21 in the cast iron a little larger than the manganese gear teeth 13 and 14, or by purposely casting the manganese teeth under the nominal proportions of any diametrical pitch tooth, the cut cast iron teeth are able during the initial use of the gear to mesh with cooperating teeth of a similar gear of this type in such a manner as to cause said machined teeth to intermesh and said gears to run with the precision of an ordinary machined gear. However, the wear of the faces of the teeth 21 is large in comparison with the wear of manganese teeth and the gear teeth 21 are also purposely made smaller transversely to their path of movement than would be ordinarily proper for the load that the gear is to carry, so that the cast iron cut gear portion wears away fairly fast. In practice the teeth 21 wear evenly; and in a short time a few uneven portions of the manganese teeth 12 and 13 come into contact with teeth of the cooperating gear and, as the teeth 21 continue to wear, receive excessive wear, and are thus reduced to the general contour of the teeth 12 and 13. Eventually, as further wear takes place, the teeth 12 and 13 take up all of the load strains. By reason of the highly resistant nature of manganese steel, the wear becomes less as the manganese members come together and the cast iron portions thereafter wear the same amount as do the manganese faces, so that the cast iron teeth are therefore relieved of practically all of the strains and the heavy duty of the gears is fully taken up by the main body of the manganese.

A modification is shown in Figs. 3 to 5 wherein as described for Figs. 1 and 2, the cast iron ring 10$^a$ may be first made, but it is provided with a series of grooves or recesses 16 (Figs. 3 and 5) therein so that when the main manganese body 11 is cast about the gear ring 10$^a$, in addition to the fusing, as described of Fig. 1, a manganese lug 20 is provided forming locking means between the blank 11$^a$ and the ring 10$^a$, thereby insuring non-rotation of the ring relative to the body 11$^a$ when in use as a gear after cutting. The treatment of this gear for further machining to a complete gear element is as described for Figs. 1 and 2. In Fig. 5 the blank 11$^a$ is shown having the lug or grooves 16 in one side face thereof, although these grooves may be provided on both sides or in any other manner so as to cause a proper interlocking of the two unlike materials when in aggregate form.

It is understood that throughout the specification and claims where the combination of the two unlike metals are associated together that in practically all instances it is intended that the two unlike metals forming the combination part are intended to be fused together by ordinary foundry practice means. However, when casting to a cold metal form is undertaken, true fusion does not always take place completely, as is desirable and necessary in the present instance; but by my method, if desired, mechanical interlocking means between the two metal forms, such as keys or grooves and ribs, may be dispensed with by completely fusing the different metals.

In order to carry on the foregoing within the limits of foundry practice, it is assumed that the main body 11 is first cast and then after being cleaned it is brought to a heat approximating 1000 to 1500 degrees Fahrenheit and is then placed in a mold whereby the softer cast iron ring or ring elements 10 may be poured into the mold with consequent fusion of the adjacent metals in the proper manner.

I claim as my invention:

1. A gear member comprising toothed portions fused together side by side.

2. A gear member comprising a hard toothed portion; and a soft toothed portion cast and fused to the side thereof and having teeth alined with the teeth of the hard portion.

3. A gear member comprising a portion having a groove with teeth on both sides, and another toothed portion cast and fused in said groove.

4. A gear member comprising hard and soft toothed portions fused side by side; said portions being provided with radial lugs forming engaging shoulder faces transverse to their path and the line of stress between the portions.

5. A gear blank comprising a main gear body of highly refractory metal, and having a supplemental metal gear body located therein, said two bodies being fused together.

6. In combination, a toothed body having a groove therein and a toothed portion received in said groove; said body and portion being fused together and respectively provided with registering teeth arranged side by side.

7. In combination, a toothed body having a groove therein and a toothed portion received in said groove; said body and portion being fused together and respectively provided with registering teeth arranged side by side; and fused and interlocking lug and recess means whereby said body and portion are held against relative movement.

8. A process comprising forming a toothed portion; and casting and fusing another portion side by side thereto.

9. A process comprising providing a toothed portion; raising the temperature of said portion to about 1000° to 1500°; and casting and fusing another portion side by side therewith.

10. A process comprising providing a toothed hard portion; raising the temperature of said portion to about 1000° to 1500°; casting and fusing a soft portion side by side therewith; and forming teeth on said soft portion alined with the teeth of the hard portion.

Signed at New York in the county of New York and State of New York this 18th day of June, A. D. 1925.

JOHN W. FULPER.